United States Patent
Kittaka et al.

(10) Patent No.: US 6,909,557 B2
(45) Date of Patent: Jun. 21, 2005

(54) OPTICAL COUPLING SYSTEM AND OPTICAL DEVICE USING THE SAME

(75) Inventors: Shigeo Kittaka, Osaka (JP); Hideshi Nagata, Osaka (JP); Tatsuhiro Nakazawa, Osaka (JP); Yasuji Sasaki, Osaka (JP); Minoru Taniyama, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 34 days.

(21) Appl. No.: 10/073,958

(22) Filed: Feb. 14, 2002

(65) Prior Publication Data

US 2003/0076598 A1 Apr. 24, 2003

(30) Foreign Application Priority Data

Feb. 15, 2001 (JP) .......................... 2001-038412

(51) Int. Cl.[7] .............................. G02B 3/00; G02B 6/18
(52) U.S. Cl. .......................................... 359/652; 385/124
(58) Field of Search ............................. 359/652–654; 385/33–34, 124

(56) References Cited

U.S. PATENT DOCUMENTS

| | | | | |
|---|---|---|---|---|
| 5,077,622 A | * | 12/1991 | Lynch et al. ................ | 359/813 |
| 5,327,447 A | * | 7/1994 | Mooradian ................... | 372/92 |
| 5,521,999 A | * | 5/1996 | Chuang et al. ............... | 385/88 |
| 5,701,373 A | * | 12/1997 | Oleskevich ................... | 385/33 |
| 5,799,121 A | | 8/1998 | Duck et al. | |
| 5,815,318 A | * | 9/1998 | Dempewolf et al. ......... | 359/653 |
| 5,986,788 A | * | 11/1999 | Sasaki et al. ............... | 359/163 |
| 6,168,319 B1 | | 1/2001 | Francis | |
| 2001/0024548 A1 | * | 9/2001 | Hamanaka et al. ........... | 385/33 |
| 2002/0057871 A1 | * | 5/2002 | Trimmer et al. .............. | 385/31 |

FOREIGN PATENT DOCUMENTS

| JP | 9-61662 | | 3/1997 |
|---|---|---|---|
| JP | 09-61662 | * | 3/1997 |

OTHER PUBLICATIONS

European Search Report dated Feb. 5, 2004.

* cited by examiner

*Primary Examiner*—Georgia Epps
*Assistant Examiner*—William Choi
(74) *Attorney, Agent, or Firm*—Whitham, Curtis & Christofferson, PC

(57) ABSTRACT

Two lenses are used for forming a collimator parallel pair, in which the distance between the two lenses is substantially made coincident with the maximum distance allowing beam waists to be formed at equal distances from the two lenses respectively.

23 Claims, 7 Drawing Sheets

OPTICAL COUPLING SYSTEM AND OPTICAL DEVICE USING THE SAME

BACKGROUND OF THE INVENTION

The present invention relates to an optical communication system and particularly to a collimator-pair optical device which is used in combination with optical fibers.

The demand for increasing the capacity of an optical fiber communication network has been intensified with the rapid and wide spread of the Internet in recent years. The development of WDM (wavelength division multiplexing) communication as means for increasing the network capacity has been promoted rapidly. In WDM communication, individual pieces of information are transmitted by light components slightly different in wavelength. It is therefore necessary to use an optical functional device good in wavelength selection characteristic such as an optical demultiplexer, an optical filter, an optical isolator or an optical circulator. It is a matter of course that the functional device is intensively demanded in terms of manufacturability, reduction in size, integration, and stability.

In most cases, the optical functional device is configured as follows. Light emitted from an end surface of an emission side optical fiber is converted into parallel luminous flux by a collimator. The parallel luminous flux is transmitted through a planar optical functional device having a function of a filter or isolator. Then, the parallel luminous flux is condensed by a condenser lens again, so that the condensed luminous flux is sent to an end surface of an incidence side optical fiber. A rod lens having a radially refractive index distribution, a spherical glass lens, or an aspherical molding lens, is used as each of the collimator and the condenser lens. The lens easiest to handle from the point of view of shape and aberration correction is a gradient index rod lens.

FIG. 1 is a schematic view showing an example of a collimator parallel pair using first and second plano-convex lenses 3 and 4 each made of a homogeneous material. Generally, in the parallel pair, two lenses equivalent to each other (lens thickness: Z) are disposed on opposite sides so as to be separated at a distance 2L from each other. In the case of lenses asymmetric in shapes of lens surfaces as shown in FIG. 1, the two lenses 3 and 4 are disposed in directions reverse to each other. That is, in the case shown in FIG. 1, the first lens 3 has a planar surface 30 as an incident surface, and a curved surface 130 as an exit surface. On the contrary, the second lens 4 has a curved surface 140 as an incident surface, and a planar surface 40 as an exit surface. The curved surfaces 130 and 140 may be spherical surfaces or may be aspherical surfaces. Optical fibers equal in mode field diameter to each other and having the same characteristic are used as an incidence side optical fiber 1 (hereinafter referred to as "light source fiber") and an exit side optical fiber 2 (hereinafter referred to as "light-receiving fiber"). The distance WD between an end surface 10 of the light source fiber 1 and the incident surface 30 of the lens 3 and the distance WD between the exit surface 40 of the lens 4 and an end surface 20 of the light-receiving fiber 2 are made equal to each other to thereby form a completely symmetric optical system.

FIG. 1 is a view in which light rays 5 are shown. Luminous flux emitted from a single-mode optical fiber, however, can be regarded as a Gaussian beam as shown in FIG. 2. In this case, two lenses 3 and 4 need to be disposed so that a beam waist (BW) 26 of a Gaussian beam 7 is formed at a midpoint between the two lenses 3 and 4 in order to obtain good coupling efficiency of the collimator parallel pair. That is, a first beam waist 16 (with radius of w1) corresponding to light 17 emitted from the light source fiber 1 forms a second beam waist 26 (with a radius of w2) at the midpoint of the optical system and is coupled to the light-receiving fiber 2 in the position of a third beam waist 36 (with a radius of w3 equal to w1) by the second lens 4.

If the wavelength used, the NA (numerical aperture) of each optical fiber and the positions of the focal point and principal point of each lens are known, then the values of WD and L in the configuration of FIG. 2 can be designed by calculation based on so-called ABCD rules using elements of a light ray matrix. Theoretically, for example, detailed numerical formulae have been described in Foundation and Application of Optical Coupling System for Optical Device, Gendai Kougaku Sha (1991) written by Kenji Kawano. Some optical design software programs available on the market have such ABCD calculating functions.

However, the inter-lens distance, that is, the distance L between the lens 3 or 4 and the second BW 26 is not allowed to be selected to be larger than the maximum value Lmax because of the presence of the maximum value Lmax. The relation between WD and L in a lens with a focal length f is typically shown in FIG. 3.

In such an optical coupling system, the ratio of the power of light incident on the light-receiving fiber to the power of light emitted from the light source fiber, that is, coupling efficiency or coupling loss is an important characteristic parameter. If L is not larger than Lmax, coupling efficiency of 100% (coupling loss of 0 dB) can be obtained theoretically when the value of WD is selected suitably. On the contrary, if L exceeds Lmax, coupling loss increases rapidly (FIG. 4). Incidentally, the value of Lmax increases substantially in proportional to the square of the focal length of the lens.

Although a completely symmetric optical system has been described above as an example, the optical coupling system may be configured so that the light source is constituted not by an optical fiber but by a light-emitting device such as a semiconductor laser while the light-receiving unit is constituted not by an optical fiber but by a photo detector such as a photo diode. Also in this case, the system can be designed on the basis of application of a Gaussian beam as described above.

Results of the ABCD calculation are, however, only based on paraxial data. The ABCD calculation can hold upon the premise that each lens has no aberration and that there is no shading caused by the influence of shortage of the effective diameter of the lens. In a lens practically used in such an optical system, loss caused by various kinds of aberration residual in the lens is inevitably produced. For this reason, the inter-lens distance 2L and the coupling loss do not always have such a simple relation as shown in FIG. 4. It is further considered that the coupling loss changes when the condition of the focal length and aberration of the lens changes in accordance with the change of temperature and humidity. In addition, the change in volume and length of a component for holding the lens or optical fiber is one of causes of the coupling loss.

SUMMARY OF THE INVENTION

The invention is devised to solve the problem and an object of the invention is provide a configuration condition in which coupling loss is minimized in an optical coupling system under the presence of a certain degree of aberration, defect, and environmental change.

According to the invention, there is provided an optical coupling system including: a first lens having an incident surface disposed in a certain direction and having a positive refractive power, by the first lens, Gaussian beam-like luminous flux incident on the incident surface from a light source being converted into approximately parallel luminous flux; and a second lens having the same refractive power as that of the first lens but having an incident surface and an exit surface disposed in a reverse direction, by the second lens, the approximately parallel luminous flux incident on the incident surface of the second lens being converted into converged luminous flux, the converged luminous flux being incident on a light-receiving unit; wherein a distance between the two lenses is selected to be approximately equal to a maximum distance allowing beam waists to be formed at equal distances from the two lenses respectively.

That is, when the distance between the two lenses is assumed to be 2L and the maximum distance allowing beam waists to be formed at equal distances from the two lenses respectively is assumed to be 2Lmax, the distance 2L is preferably in a range given by the expression $1.8Lmax \leq 2L \leq 2Lmax$.

Further, in the optical coupling system according to the invention, total coupling loss is-set to be equal to or smaller than coupling loss which occurs when the distance 2L between the two lenses is in a range given by the expression $0 \leq 2L < 1.8Lmax$. The value of total coupling loss is desirably not larger than 0.05 dB.

The optical coupling system according to the invention includes: a lens having a positive refractive power, by the lens, Gaussian beam-like luminous flux emitted from a light source being converted into approximately parallel luminous flux; and a reflection surface disposed at the rear of the lens so that the approximately parallel luminous flux is reflected by the reflection surface to return to the lens, the returning luminous flux being converted, by the lens, into converged luminous flux which is incident on a light-receiving unit disposed in the light source and its vicinity; wherein a distance between the lens and the reflection surface is selected to be approximately equal to the maximum distance allowing the lens to form a beam waist.

That is, when the distance between the lens and the reflection surface is assumed to be L and the maximum distance allowing the lens to form a beam waist is assumed to be Lmax, the distance L is preferably selected to be in a range given by the expression $0.9Lmax \leq L \leq Lmax$.

Further, in the optical coupling system according to the invention, total coupling loss is set to be equal to or smaller than coupling loss which occurs when the distance L between the lens and the refection surface is in a range given by the expression $0 \leq L < 0.9Lmax$. The value of total coupling loss is desirably not larger than 0.05 dB.

The light source and the light-receiving unit are constituted by end surfaces of optical fibers which are equal in mode field diameter to each other. Incidentally, in the case of the optical coupling system according to the invention, an end surface of an optical fiber can be used so as to serve as the light source and also as the light-receiving unit.

A rod lens having a gradient index distribution in a direction of the radius thereof, a plano-convex lens having a gradient index distribution in a direction of the optical axis thereof, a plano-convex lens made of a homogeneous material, a sphere lens made of a homogeneous material, or a grating lens surface may be used as the lens having a positive refractive power.

An optical device is constituted by the optical coupling system according to the invention, and an optical functional device disposed at a midpoint between the two lenses in the optical coupling system. In the optical coupling system according to the invention, an optical functional device may be disposed at a midpoint between the lens and the reflection surface so that an optical device can be formed. In the optical device, the optical coupling system may be provided as an array in which optical coupling systems having the same function are arranged in one row or in a plurality of rows.

In the optical coupling system according to the invention (i.e., the distance between the lenses or the distance between the lens and the reflection surface corresponds to the maximum distance allowing each lens to form a beam waist), coupling loss changes little as a result of an increase in aberration or defects compared to an ideal optical system or in the case where the performance of the optical system varies in accordance with environmental change. In addition, the performance of the optical device obtained by applying the optical coupling system according to the invention changes little as a result of displacement from the ideal design condition or as a result of environmental change.

The present disclosure relates to the subject matter contained in Japanese patent application No. 2001-038412 (filed on Feb. 15, 2001), which is expressly incorporated herein by reference in its entirety.

DESCRIPTION OF THE PREFERRED EMBODIMENT

Figure 3:
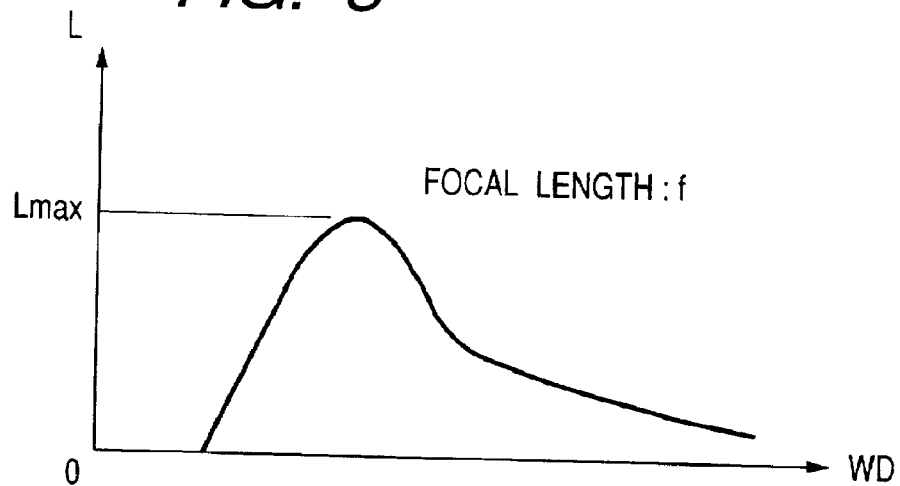
FIG. 3 is a graph typically showing the relation between the distance WD of each lens from a corresponding optical fiber and the distance (half value) L between the two lenses.
Figure 4:
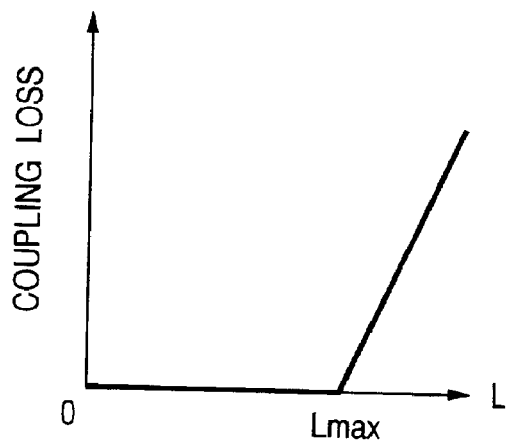
FIG. 4 is a graph typically showing the relation between the distance (half value) L between two ideal lenses and coupling loss.
Figure 5:
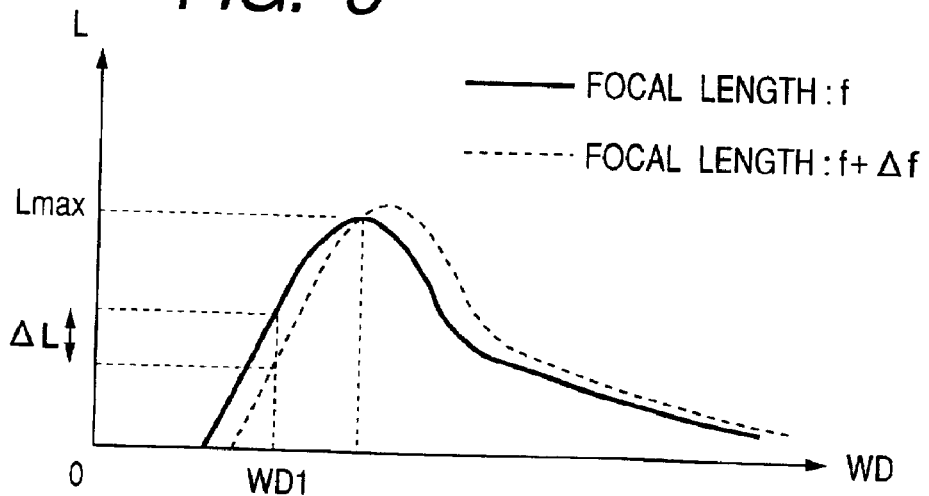
FIG. 5 is a graph typically showing the relation between WD and L in the case where the focal length f of each lens varies.

FIG. 5 is a graph in which the relation in a lens with a focal length of (f+Δf) slightly larger than f overlaps the relation in the graph shown in FIG. 3. When, for example, WD is equal to WD1, the difference (ΔL) between the L values of the two lenses expresses the difference between the second BW positions based on the difference between the focal lengths of the two lenses.

Incidentally, in FIG. 5, it is found that when WD is set so that the L value approaches Lmax, the value of ΔL becomes very small. This means that when the L value approaches Lmax, the second and third BW positions little change in spite of the change of the focal length.

According to results (an example of design which will be described later) of calculation of the relation between the BW position and the coupling loss in a real parallel pair optical system, it is found that increase in coupling loss due to the change of the focal length becomes very small when there are satisfied the following two conditions:

(1) the distance between the pair of parallel lenses is set to be near 2Lmax; and (2) the changes of the focal lengths of the two lenses due to some cause are equal to each other.

The following points need be considered with respect to causes of the change of the BW position bringing increase in coupling loss.

(1) The BW position changes in accordance with the wavelength difference between used wavelengths on the basis of chromatic aberration on the axis of each lens.

(2) The predicted environment such as temperature and humidity changes in use to thereby change the focal length of each lens in accordance with the used wavelength to thereby change the BW position.

(3) The predicted environment such as temperature and humidity changes in use to thereby change the volume of a structure for holding the optical system or change the refractive index of a medium placed in the middle of the optical system to thereby change the BW position.

(4) When optic-axial asymmetry is present in each lens so that astigmatism occurs on the optical axis, a plurality of BW positions are generated.

(5) A plurality of BW positions are generated by the birefringence of each lens.

In accordance with these factors, the "configuration to make the distance between the lenses coincident with Lmax" of the invention is effective in specific cases listed as follows.

[1] Case of Use of Lens Large in Axial Chromatic Aberration

In the case of a pair of lenses used in WDM (wavelength division multiplexing), coupling loss increases at a wavelength far from a design reference wavelength when axial chromatic aberration is large. In the configuration of the invention, however, the influence of axial chromatic aberration can be suppressed to be small. Examples of the lens large in chromatic aberration include a kinoform-shaped grating lens, a single glass lens with a large focal length, and a plastic lens. Especially, the grating lens has remarkably large axial chromatic aberration (tens of times as large as that of a convex glass lens), so that the configuration of the invention is particularly effective.

[2] Case of Lens Largely Changing in Accordance with Environment (Such as Temperature and Humidity)

A plastic aspherical lens is inexpensive because it can be mass-produced by pressing. The plastic aspherical lens, however, has a problem that the change of the focal length or aberration of the lens in accordance with temperature or humidity is very large compared with that of a glass lens. According to the configuration of the invention, however, the change of coupling loss due to this cause can be suppressed to be small.

[3] Case of Suppressing Environmental Change to be Particularly Small

In most cases, suppression (athermancy) of the change of characteristic due to temperature is severely required of the whole of a communication optical system as well as lenses in the system. As methods for improving athermancy, there are used a method of keeping the whole of the system at a constant temperature, a method using a material little in its temperature change, and a method using materials in combination to cancel their temperature changes. When the configuration of the invention is provided in addition to these methods, there is an effect in reducing the change of coupling loss caused by the change of the optical path length.

[4] Case of Rod Lens with Distortion

In a rod lens having a gradient index distribution in a direction of the optical axis thereof, the thermal expansion coefficient of the material of the lens changes in accordance with a distance from the optical axis. Hence, in most cases, radial distortion remains. Particularly in a lens with a long focal length, the quantity of distortion becomes large. In a lens with distortion, the focal length of the lens varies in accordance with the direction of polarization of incident light because of a phenomenon of birefringence. Hence, focusing is so insufficient that coupling loss becomes large. According to the configuration of the invention, however, sharp focusing can be performed to reduce coupling loss because the position of BW is trued up even in the case where the focal length varies.

Figure 1:
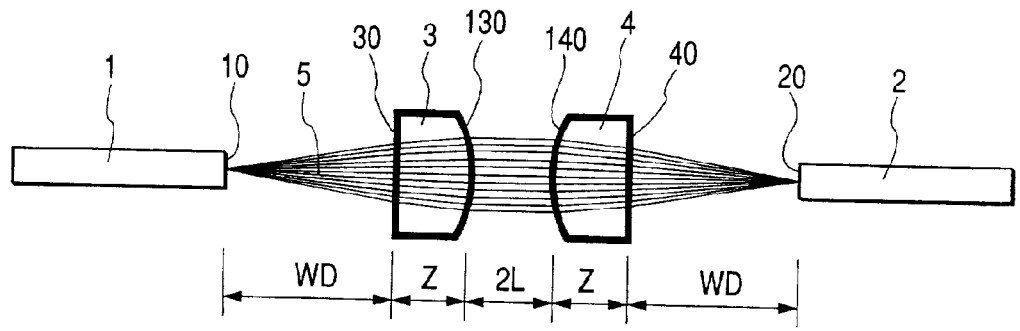
FIG. 1 is an explanatory view geometrically showing coupling of optical fibers by a collimator parallel pair.
Figure 2:
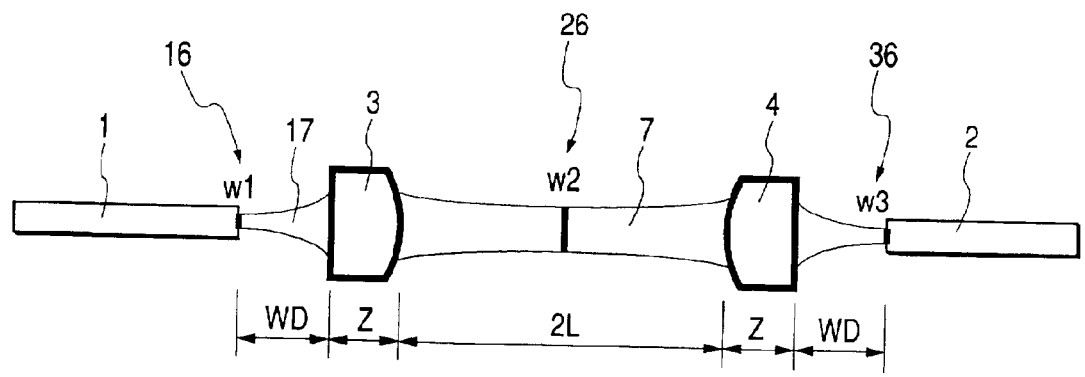
FIG. 2 is an explanatory view showing coupling of optical fibers by a collimator parallel pair in terms of typical Gaussian beams.
Figure 6:
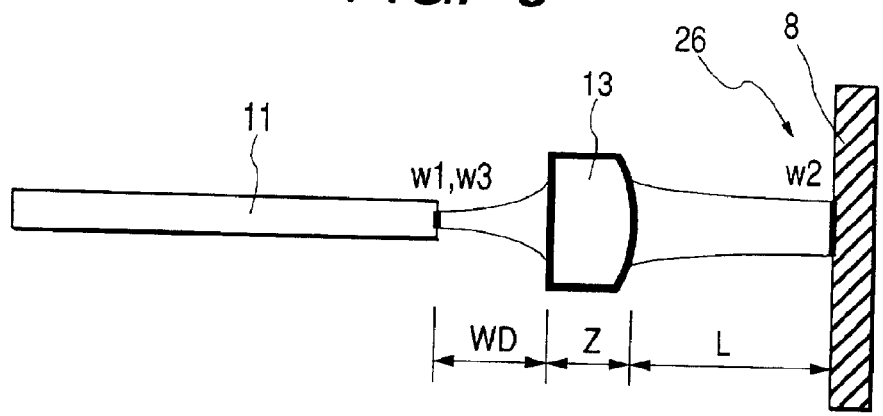
FIG. 6 is a view for explaining a configuration in which a lens, an optical fiber and a reflection surface are used.

As shown in FIG. 6, a reflecting mirror 8 may be set in a position corresponding to the position of the second beam waist 26 at the midpoint between the lenses shown in FIG. 2 so that light is returned to an optical fiber 11 which serves as a light source fiber and also as a light-receiving fiber. Also in this configuration, the effect of the invention can be fulfilled. In the case shown in FIG. 6, the condition (2) of the conditions is always satisfied:

(1) the distance between the pair of parallel lenses is set to be near 2Lmax; and (2) the changes of the focal lengths of the two lenses due to some cause are equal to each other.

Accordingly, when the distance between the lens 13 and the reflecting mirror 8 is set to be near Lmax, there is an effect in suppressing increase of coupling loss caused by defects even in the case where the lens used has more or less the defects as follows:

Aberration based on optic-axial asymmetry (astigmatism generated on the optical axis);

Variation of the focal length from a standard value; and

Variation of the lens thickness from a standard value.

Figure 7:
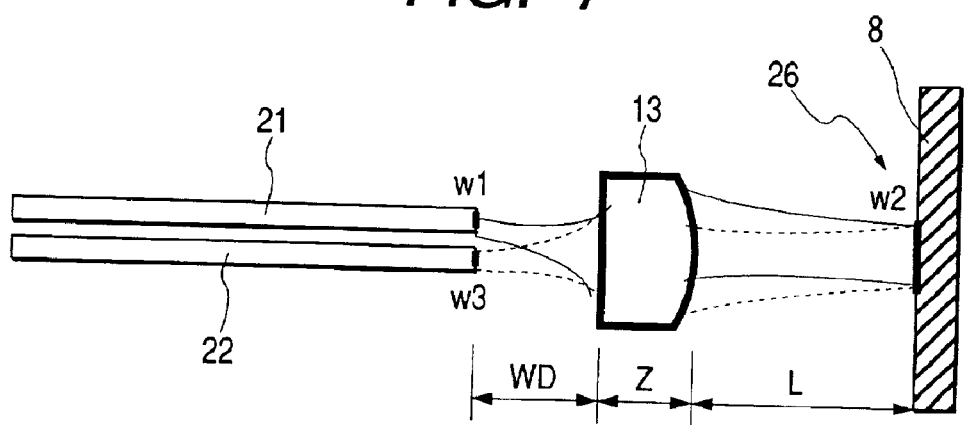
FIG. 7 is a view for explaining a configuration in which a lens, two optical fibers and a reflection surface are used.

Incidentally, as shown in FIG. 7, a light source fiber 21 and a light-receiving fiber 22 in the proximity of the light source fiber 21 are provided separately. Also in the configuration shown in FIG. 7, the same effect as in the configuration shown in FIG. 6 can be obtained.

A specific lens system will be described below on the basis of results of calculation of the relation between the quantity of astigmatism and coupling loss. The calculation was made by use of lens design software "OSLO Six" made by Sinclair Optics, Inc., in the U.S.

[Design Sample 1]

A collimator parallel pair constituted by grating lenses was designed and coupling loss was calculated.

(Designed Values of Grating Lens)

Figure 8:
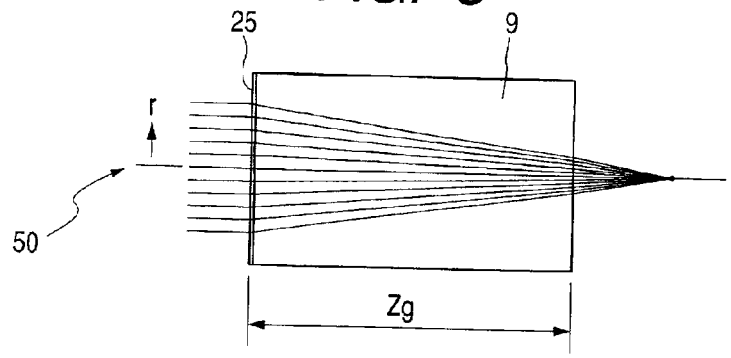
FIG. 8 is a view showing the optical path of a grating lens.

FIG. 8 shows the configuration of each single lens. A grating lens (kinoform shape) 25 with a focal length of 1 mm and an NA of 0.2 was set on a surface of quartz glass 9 with a thickness Zg of 1 mm. The designed wavelength λ was 1550 nm. A focal point due to primary light was used.

A wave surface due to a plane of diffraction was shaped like a parabola with respect to a distance r from an optical axis 50.

Wave Surface Function: $\Phi(r)=(2\pi/\lambda)\cdot d_{f1}\cdot r^2$

Constant: $d_{f1}=-0.500$

Zone Depth: 0.00351 mm

Axial Wavefront Aberration: RMS−OPD=0.0062λ

Incidentally, spherical aberration can be ignored, so that correction due to high-order terms was not required.

(Axial Chromatic Aberration)

Figure 9:
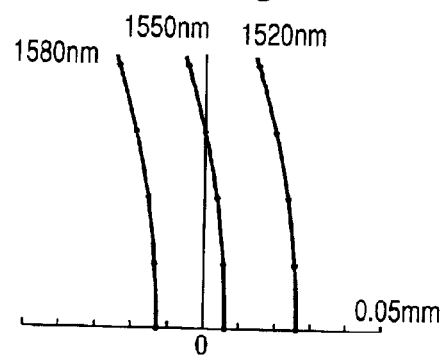
FIG. 9 is a view showing longitudinal spherical aberration of a grating lens.

FIG. 9 shows longitudinal aberration of an a focal single lens in three wavelengths (1520, 1550 and 1580 nm). It is found that the focal position moves by about 20 μm with respect to Δλ=30 nm because the axial chromatic aberration is very large. This is a problem on such a grating lens.

(Coupling Efficiency of Collimator Parallel Pair)

Figure 10:
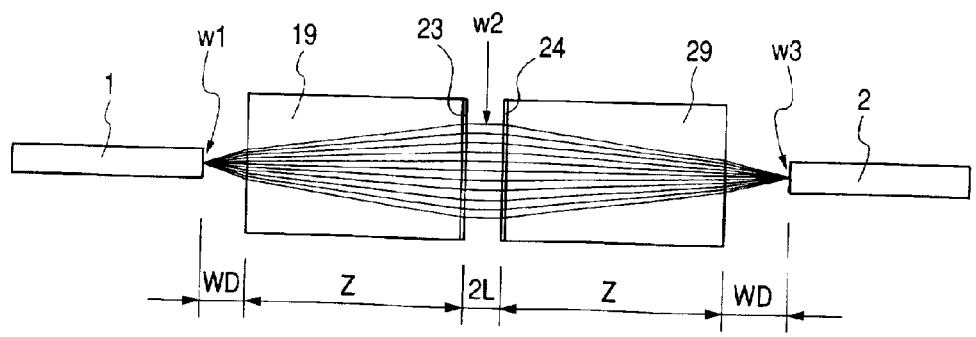
FIG. 10 is a view showing a configuration of an optical coupling system according to a first design sample.

As shown in FIG. 10, grating lenses 23 and 24 formed on surfaces of two pieces of quartz glass 19 and 29 respectively were disposed, in the same manner as described above, as a parallel pair symmetrically between a light source fiber 1 and a light-receiving fiber 2 having a mode field diameter equal to that of the light source fiber 1. Coupling loss was calculated by the following procedure. For calculation, the diameter and position of BW (on the basis of ABCD calculation) were considered but loss due to surface reflection, internal absorption, diffraction efficiency and spherical aberration was ignored. The light source fiber 1 and the light-receiving fiber 2 were both provided to have an NA of 0.1 (1/$e^2$ strength) at a wavelength λ=1550 nm.

(1) The inter-lens distance 2L was first selected to optimize WD so that a beam waist came into the middle.
(2) Coupling loss at λ=1550 nm was calculated.
(3) Coupling loss at λ=1520 nm was calculated in the same configuration but in the condition of each optical fiber of NA=0.1 at λ=1520 nm.
(4) Coupling loss was calculated in the same manner as described above except that the wavelength λ of light source was set to 1580 nm.

(a) Case of Short L

Table 1 shows results of calculation in the case of L=0.0836 nm and WD=0.3053 nm.

Coupling loss at λ=1550 nm was small. The position of BW, however, moved largely on the receiving side when λ changed. Hence, large loss of from 0.5 to 0.8 dB was produced in the Δλ range of ±30 nm.

TABLE 1

| Wavelength (nm) | Light Source BW Radius w1 (μm) | Light-Receiving Side BW Position (μm) | Light-Receiving Side BW radius w3 (μm) | Coupling Loss (dB) |
|---|---|---|---|---|
| 1550 | 4.909 | 0 | 4.909 | 0.004 |
| 1520 | 4.814 | 40.48 | 4.993 | 0.753 |
| 1580 | 5.004 | −37.59 | 4.831 | 0.551 |

(b) Case of L=Lmax

In this optical system, L was Lmax=11.237 mm when WD was 0.3561 mm. Table 2 shows results of calculation.

Coupling loss at λ=1550 nm was so small that the coupling loss little changed compared with the case where L was short. The change of the BW position was, however, small on the light-receiving side even in the case where λ was changed. Hence, coupling loss little changed and was kept smaller than 0.05 dB.

TABLE 2

| Wavelength (nm) | Light Source BW Radius w1 (μm) | Light-Receiving Side BW Position (μm) | Light-Receiving Side BW radius w3 (μm) | Coupling Loss (dB) |
|---|---|---|---|---|
| 1550 | 4.909 | 0 | 4.909 | 0.004 |
| 1520 | 4.814 | 1.568 | 4.641 | 0.012 |
| 1580 | 5.004 | −5.098 | 4.349 | 0.083 |

It is apparent from the results that coupling loss is small and little depends on the inter-lens distance L in the optimum design wavelength λ=1550 nm and its vicinity, but strongly depends on L when the wavelength changes from the optimum design wavelength. In the configuration of the invention in which L is set to be equal to Lmax, however, coupling loss caused by chromatic aberration is reduced greatly compared with the case where L is sufficiently smaller than Lmax (typically, the case where L is set to approach zero). That is, in the optical coupling system according to the invention, the influence of chromatic aberration of the real grating lens on coupling loss can be suppressed to be small.

Incidentally, the problem of chromatic aberration is more or less present in any lens other than the grating lens. Hence, the optical coupling system configured according to the invention is effective in a general lens having chromatic aberration.

[Design Sample 2]

A collimator parallel pair of "aspherical plano-convex lenses" was designed. Coupling loss of the collimator parallel pair was calculated in the case where R of each convex surface changed.

(Design Values of Plano-Convex Lens)

The design wavelength λ was set to 1550 nm. A lens of glass with a refractive index of 1.520 and with a lens thickness of 1.00 mm was set. The spherical aberration of the lens was corrected with R of the convex surface as 1.716 mm and the aspherical coefficient (fourth order term) as −0.0152 $mm^{-4}$.

Axial Wavefront Aberration: RMS−OPD=0.0067λ

Focal Length: 3.30 mm

NA: 0.20 (effective diameter: Φ1.32 mm)

(Coupling Loss of Collimator Parallel Pair)

Figure 11:
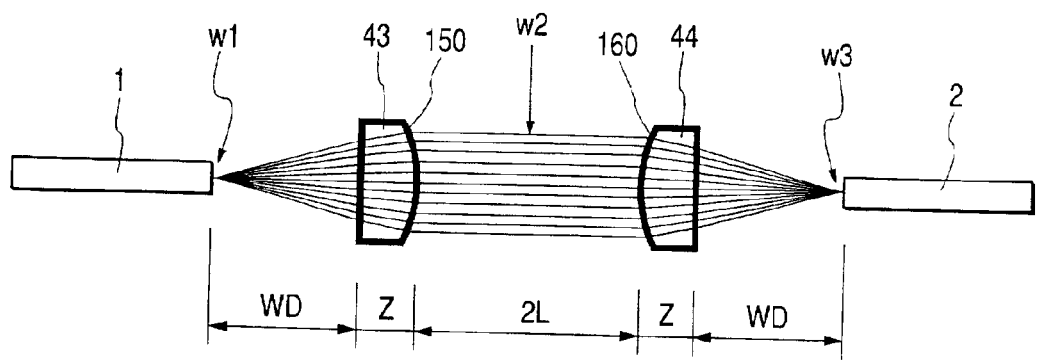
FIG. 11 is a view showing a configuration of an optical coupling system according to a second design sample.

As shown in FIG. 11, aspherical plano-convex lenses 43 and 44 of the same specifications as described above were disposed symmetrically as a parallel pair between a light source fiber 1 and a light-receiving fiber 2 equal in mode field diameter to the light source fiber 1. Coupling loss of the parallel pair was calculated in the same manner as in Design Sample 1.

As variables, R of a convex surface 150 of the lens 43 and R of a convex surface 160 of the lens 44 were changed simultaneously. The wavelength λ, the aspherical coefficient, L, WD, the lens thickness Z and the refractive index of glass were selected to be constant.

Figure 12:
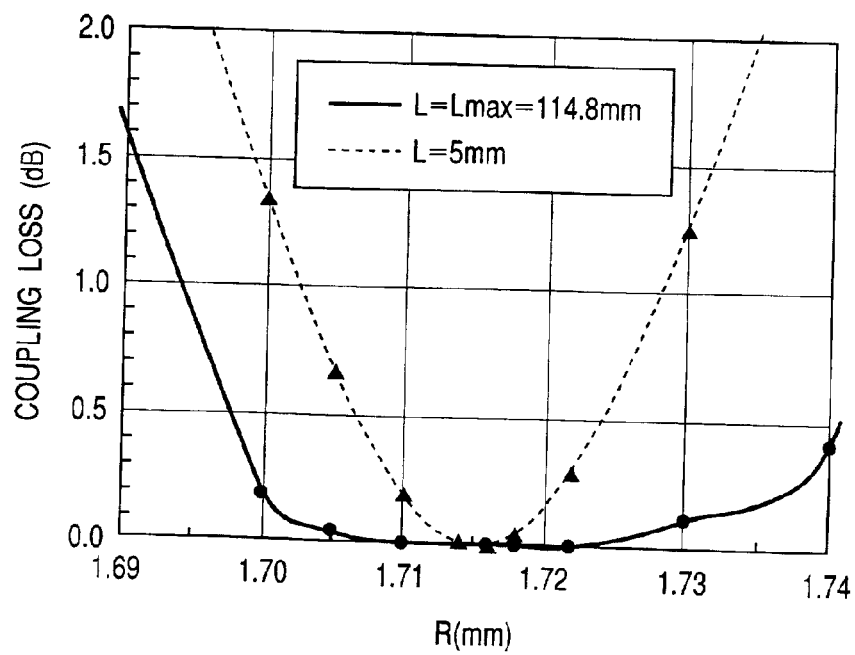
FIG. 12 is a graph showing results of calculation of coupling loss in the second design sample.

Table 3 and FIG. 12 show results of calculation in the following cases.

(1) Case of Short L (L=5.00 mm, WD=2.6425 mm)
(2) Case of Lmax (L=114.8 mm, WD=2.6900 mm)

TABLE 3

| R of Concave Surface (mm) | L = 5.00 mm | | | L = Lmax = 114.8 mm | | |
|---|---|---|---|---|---|---|
| | BW Radius w3 ($\mu$m) | BW Position ($\mu$m) | Coupling Loss (dB) | BW Radius w3 ($\mu$m) | BW Position ($\mu$m) | Coupling Loss (dB) |
| 1.680 | 5.027 | −140 | 4.608 | 2.681 | −49.3 | 3.048 |
| 1.700 | 4.958 | −61.8 | 1.341 | 4.075 | −9.6 | 0.175 |
| 1.705 | 4.942 | −42.4 | 0.661 | 4.456 | −3.6 | 0.038 |
| 1.710 | 4.927 | −23.1 | 0.187 | 4.755 | −0.67 | 0.005 |
| 1.714 | 4.915 | −7.7 | 0.013 | 4.887 | −0.02 | 0.004 |
| 1.716 | 4.909 | −0.04 | 0.004 | 4.907 | 0 | 0.004 |
| 1.718 | 4.903 | 7.6 | 0.046 | 4.895 | 0.02 | 0.004 |
| 1.722 | 4.892 | 22.9 | 0.280 | 4.781 | 0.66 | 0.005 |
| 1.730 | 4.869 | 53.5 | 1.241 | 4.303 | 6.6 | 0.103 |
| 1.740 | 4.843 | 91.5 | 2.885 | 3.583 | 22.6 | 0.399 |
| 1.750 | 4.818 | 129.4 | 4.569 | 2.971 | 43.2 | 2.271 |

Also in this optical system, coupling loss little depends on L when the L is sufficiently smaller than Lmax if R of the convex surface is near the design value. As shown in FIG. 12, the range of 1/R to make the coupling loss not larger than 0.05 dB is, however, a very narrow range of ±0.004 mm$^{-1}$ relative to the design value when L is short. On the contrary, in the optical coupling system according to the invention in which L is set to be equal to Lmax, the range of 1/R to make the coupling loss not larger than 0.05 dB is enlarged greatly to a range of ±0.02 mm$^{-1}$ relative to the design value. Moreover, the value of the coupling loss is always smaller than that in the case where L is short. It is proved from the results that in the configuration of the invention, the change of coupling loss can be suppressed to be very small even in the case where R of the plano-convex lens varies and the focal length thereof varies in accordance with the environmental change. The same effect as described above can be obtained for factors (the change of the refractive index, and the change of the lens thickness) causing the change of the focal length other than R. Accordingly, the configuration of the invention has an effect on any general lens having positive refractive power other than the aspherical plano-convex lens.

[Design Sample 3]

An optical system was designed from a combination of a "gradient index rod lens" and a reflecting mirror. Coupling loss was calculated in the case where the rod lens was optic-axially asymmetric.

(Design Values of Gradient Index Rod Lens)

Assume now that the gradient index distribution in the direction of the radius of the rod lens is given by the following expression:

$$n(r)^2 = n_0^2 \{1 - (g \cdot r)^2 + h_4 (g \cdot r)^4\}$$

in which $n_0$ is the axial refractive index, r is the distance from the optical axis, and g and $h_4$ are gradient index distribution coefficients.

In a design wavelength of 1550 nm, setting was made as follows.

$n_0$: 1.600

Lens Length Z: 4.430 mm g=0.326 (1/mm)

$h_4$=0.67

Lens Radius: 0.90 mm

Axial Wavefront Aberration: RMS−OPD=0.0050$\lambda$

Focal Length: 1.933 mm

NA: 0.20 (effective diameter: $\Phi$0.774 mm)

(Coupling Efficiency in Case of Optic-Axial Asymmetry)

Figure 13:
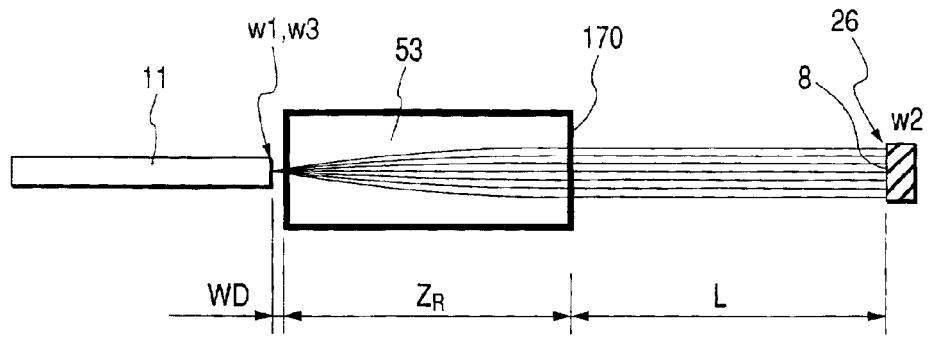
FIG. 13 is a view showing a configuration of an optical coupling system according to a third design sample.

As shown in FIG. 13, a lens 53 having the same specifications as described above and an optical fiber 11 serving as a light source fiber and also as a light-receiving fiber were disposed and a reflection surface 8 of a reflecting mirror was disposed in the second BW position 26. Coupling loss was calculated in the case. First, optimum WD was obtained with respect to the L value shown in the following Table 4.

TABLE 4

| L (mm) | L/Lmax | WD (mm) |
|---|---|---|
| 10.89 | 0.283 | 0.251 |
| 26.94 | 0.7 | 0.264 |
| 30.78 | 0.8 | 0.268 |
| 34.63 | 0.9 | 0.275 |
| 38.48 | 1 | 0.293 |

Then, a surface of the lens opposite to the reflection surface 8 was provided as a cylindrical surface with a curvature radius Rc to generate axial astigmatism. The change of coupling efficiency in the case was calculated.

Figure 14:
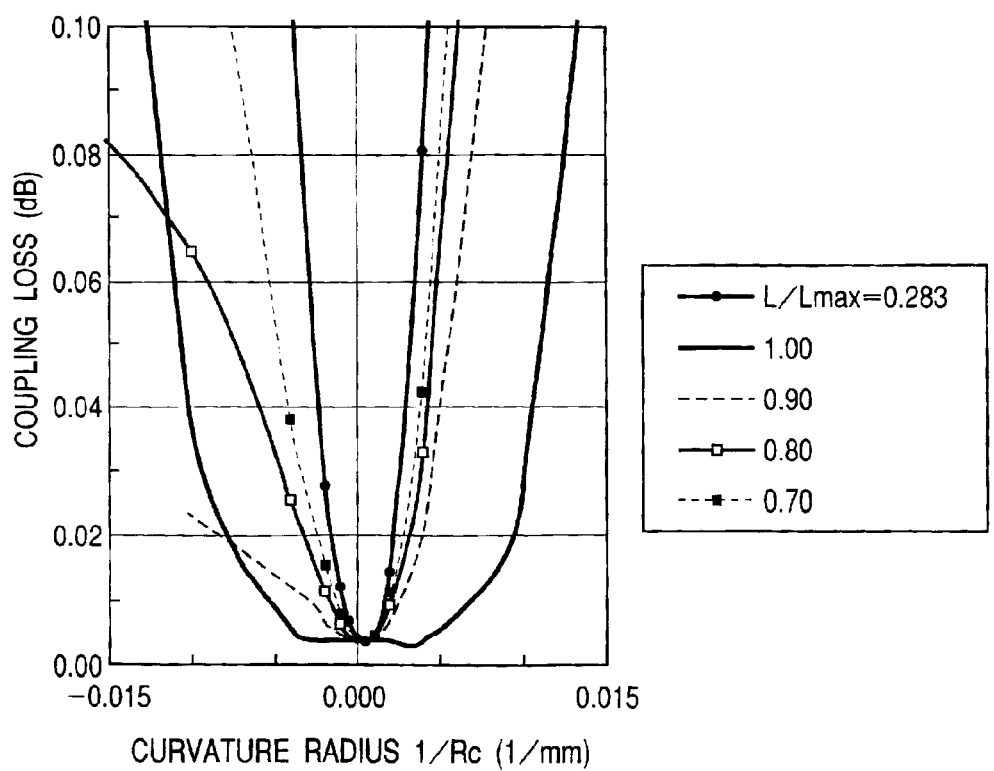
FIG. 14 is a graph showing results of calculation of coupling loss in the third design sample.

The wavelength $\lambda$, L, WD, and the lens length $Z_R$ were selected to be constant. Table 5 and FIG. 14 show results of the calculation.

TABLE 5

| Rc (mm) | WD ($\mu$m) | BW Position ($\mu$m) | Coupling Loss (dB) |
|---|---|---|---|
| L/Lmax = 1.00 | | | |
| −100 | 4.441 | −4.10 | 0.038 |
| −250 | 4.820 | −0.32 | 0.006 |
| −500 | 4.884 | −0.05 | 0.004 |
| −1000 | 4.902 | −0.01 | 0.004 |
| −2000 | 4.907 | 0.00 | 0.004 |
| (plane) | 4.909 | 0.00 | 0.004 |
| 2000 | 4.909 | 0.00 | 0.004 |
| 1000 | 4.906 | 0.00 | 0.004 |
| 500 | 4.892 | 0.03 | 0.004 |
| 250 | 4.835 | 0.27 | 0.004 |
| 100 | 4.472 | 3.82 | 0.026 |
| L/Lmax = 0.90 | | | |
| −100 | 5.441 | −0.28 | 0.023 |
| −250 | 5.219 | −1.92 | 0.012 |
| −500 | 5.075 | −1.33 | 0.007 |
| −1000 | 4.994 | −0.75 | 0.005 |
| −2000 | 4.952 | −0.40 | 0.004 |
| (plane) | 4.904 | 0.00 | 0.004 |
| 2000 | 4.864 | 0.45 | 0.004 |
| 1000 | 4.819 | 0.95 | 0.005 |
| 500 | 4.727 | 2.06 | 0.007 |
| 250 | 4.537 | 4.78 | 0.021 |
| 100 | 3.970 | 16.03 | 0.176 |
| L/Lmax = 0.80 | | | |
| −100 | 5.883 | −6.21 | 0.064 |
| −250 | 5.336 | −5.05 | 0.025 |
| −500 | 5.124 | −2.89 | 0.011 |
| −1000 | 5.016 | −1.53 | 0.006 |
| −2000 | 4.962 | −0.78 | 0.006 |
| (plane) | 4.909 | 0.00 | 0.004 |
| 2000 | 4.855 | 0.83 | 0.004 |
| 1000 | 4.801 | 1.70 | 0.005 |
| 500 | 4.695 | 3.53 | 0.009 |
| 250 | 4.487 | 7.55 | 0.033 |
| 100 | 3.914 | 21.64 | 0.276 |
| L/Lmax = 0.70 | | | |
| −100 | 6.108 | −15.09 | 0.138 |
| −250 | 5.375 | −8.18 | 0.038 |
| −500 | 5.137 | −4.34 | 0.015 |
| −1000 | 5.021 | −2.22 | 0.008 |

TABLE 5-continued

| Rc (mm) | WD (μm) | BW Position (μm) | Coupling Loss (dB) |
|---|---|---|---|
| −2000 | 4.964 | −1.11 | 0.005 |
| (plane) | 4.908 | 0.00 | 0.004 |
| 2000 | 4.852 | 1.18 | 0.004 |
| 1000 | 4.797 | 2.36 | 0.005 |
| 500 | 4.689 | 4.79 | 0.011 |
| 250 | 4.482 | 9.85 | 0.042 |
| 100 | 3.931 | 26.12 | 0.338 |
| L/Lmax = 0.283 | | | |
| −100 | 5.592 | −43.26 | 0.377 |
| −250 | 5.162 | −16.81 | 0.108 |
| −500 | 5.032 | −8.33 | 0.027 |
| −1000 | 4.970 | −4.15 | 0.012 |
| −2000 | 4.939 | −2.01 | 0.007 |
| (plane) | 4.909 | 0.00 | 0.004 |
| 2000 | 4.879 | 2.06 | 0.003 |
| 1000 | 4.849 | 4.12 | 0.005 |
| 500 | 4.791 | 8.19 | 0.015 |
| 250 | 4.679 | 16.23 | 0.081 |
| 100 | 4.371 | 39.62 | 0.462 |

Axial astigmatism is small and little depends on L when Rc is zero and in its vicinity. The range of 1/Rc to make coupling loss not larger than 0.05 dB is, however, a narrow range of ±0.01 mm$^{-1}$ when the value of L/Lmax is smaller than 0.9. On the contrary, in the case of L/Lmax =1 according to the configuration of the invention, the range of 1/Rc to make coupling loss not larger than 0.05 dB is enlarged to a range of ±0.02 mm$^{-1}$ or more. Incidentally, if the value of L/Lmax is larger than 1, the beam waist cannot be formed on the reflection surface so that coupling loss is generated even in the case where there is no astigmatism. Hence, this case is unsuitable for an optical coupling system.

It is apparent from the results that the change of coupling loss can be suppressed to be very small according to the configuration of the invention even in the case where the lens has optic-axial asymmetry. The same effect as described above can be obtained also for any factors (optic-axial asymmetry of the refractive-index distribution, failure of centering, and striae) causing optic-axial asymmetry other than the factor on the external form of the lens.

Although the Design Samples 1 to 3 have shown a grating lens surface, a plano-convex aspherical lens and a radially gradient index rod lens, the same effect as in the Design Samples 1 to 3 can be obtained in any lens if the lens has positive refractive power and can form an optical coupling system. Besides the lenses described above, a spherical lens, a sphere lens, or an optic-axially gradient index plano-convex lens may be used.

Although the description has been made upon the case where both the light source and the light-receiving unit are constituted by optical fibers, the light source may be constituted by a semiconductor laser if the light source can be regarded as emitting a Gaussian beam. Further, the light-receiving unit may be constituted by a light-receiving element.

Figure 15:
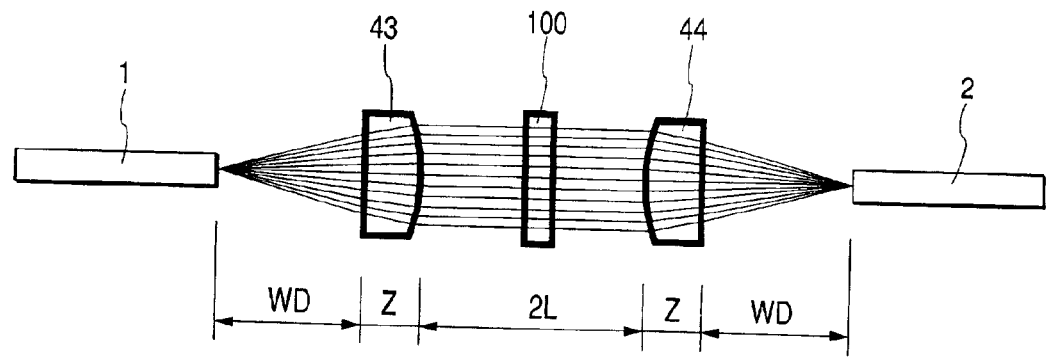
FIG. 15 is a view showing an optical device using the optical coupling system according to the second design sample.

The optical coupling system according to the invention may be applied to an optical device as follows. For example, as shown in FIG. 15, an optical functional device 100 is inserted between the two lenses in the optical coupling system shown in FIG. 11. Examples of the optical functional device allowed to be used are an optical filter, an optical isolator, an optical modulator, and an optical switching device. If the device can be operated by incidence of approximately parallel light beams, the device can be used for wide purposes. In the condition that a plurality of optical coupling systems having the same function are provided in the form of an array, optical functional devices of the same function or having different functions may be inserted therein respectively.

When, for example, optically multiplexed light with a plurality of wavelengths is emitted from a plurality of light source fibers in the condition that band-pass filters different in pass band are inserted in the optical coupling systems, light beams in different wavelength ranges are coupled to the light-receiving fibers respectively. Thus, an optical demultiplexing function can be obtained. The coupling loss of the optical coupling system configured according to the invention is very small so that an optical device having good characteristic can be obtained.

Figure 16:
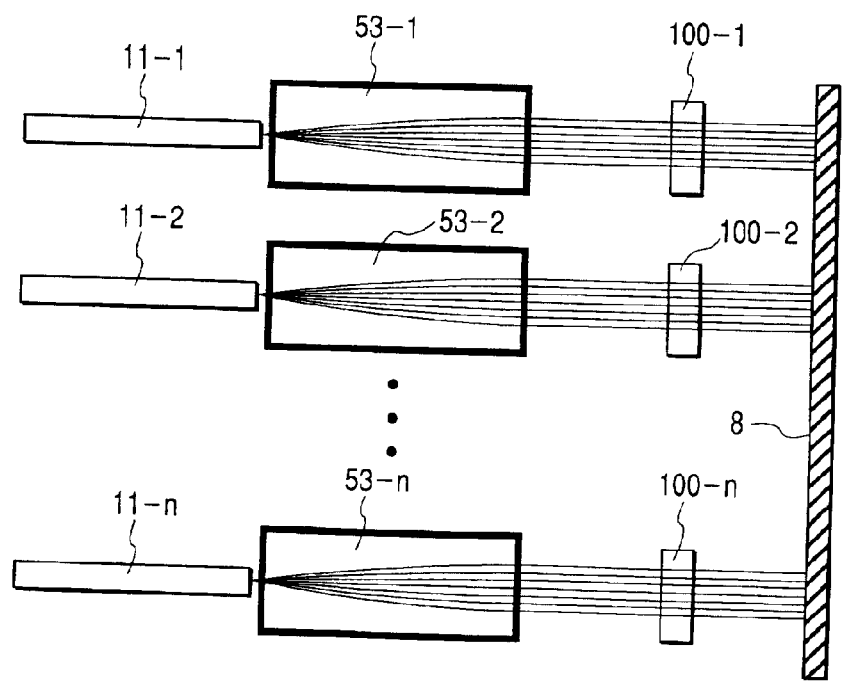
FIG. 16 is a view showing a configuration of an optical device using a plurality of optical coupling systems according to the third design sample.

For example, as shown in FIG. 16, optical functional devices may be inserted in optical coupling systems shown in FIG. 13. In this case, light passes through each optical functional device by twice in the round trip of the light. FIG. 16 shows an example in which a plurality of lenses 53-1, 53-2, . . . , 53-n are arranged to form an array of optical coupling systems. Like the description made above, the optical functional devices 100-1, 100-2, . . . , 100-n may be the same or different in accordance to the purpose. It is unnecessary to arrange a plurality of reflection surfaces 8. As shown in FIG. 16, one reflection surface 8 may be used in common to all the optical coupling systems.

As described above, when an optical coupling system constituted by two lenses according to the invention is used, both the change of coupling loss due to the substantial defects (chromatic aberration, and birefringence based on distortion) of each lens and the change of coupling loss due to the environmental change (temperature and humidity) can be suppressed to be small. Further, when an optical coupling system constituted by a combination of a lens and a reflecting mirror according to the invention is used, the change of coupling loss due to the defects (variation in focal length and astigmatism caused by optic-axial asymmetry) of the lens can be suppressed to be small. Hence, even in the case where the lens has some degree of substantial defects, the influence of the defects on the performance of the system is so small that the allowable range on production is widened to improve the yield on production. In addition, the change of the performance resulting from environmental change is so small that the reliability of the system is improved.

What is claimed is:

1. An optical coupling system comprising:
a first lens having an incident surface disposed in a certain direction and having a positive refractive power, by said first lens, Gaussian beam-like luminous flux incident on said incident surface from a light source being converted into approximately parallel luminous flux; and
a second lens having the same refractive power as that of said first lens but having an incident surface and exit surface disposed in a reverse direction, by said second lens, said approximately parallel luminous flux incident on said incident surface of said second lens being converted into converged luminous flux, said converged luminous flux being incident on a light-receiving unit, wherein said light receiving unit is an optical fiber, and;
wherein a distance 2L between the two lenses is selected to be in a range given by an expression:

$$1.8 \text{Lmax} \leq 2L \leq 2\text{Lmax}$$

in which 2Lmax is a maximum distance allowing beam waists to be formed at equal distance from the two lenses respectively.

2. An optical coupling system according to claim 1, wherein total coupling loss is equal to or smaller than coupling loss which occurs when the distance 2L between the two lenses is in a range given by an expression $0 \leq 2L \leq 1.8 Lmax$.

3. An optical coupling system according to claim 2, wherein said total coupling loss is not larger than 0.05 dB.

4. An optical coupling system according to claim 1, wherein said light source and said light-receiving unit are constituted by end surfaces of optical fibers which are equal in mode field diameter to each other.

5. An optical coupling system according to claim 1, wherein said lens having a positive refractive power is a rod lens having a gradient index distribution in a direction of a radius thereof.

6. An optical coupling system according to claim 1, wherein said lens having a positive refractive power is a plano-convex lens having a gradient index distribution in a direction of an optical axis thereof.

7. An optical coupling system according to claim 1, wherein said lens having a positive refractive power is a plano-convex lens made of a homogeneous material.

8. An optical coupling system according to claim 1, wherein said lens having a positive refractive power is a sphere lens made of a homogeneous material.

9. An optical coupling system according to claim 1, wherein said lens having a positive refractive power has a grating lens surface.

10. An optical device comprising an optical coupling system defined in claim 1, and an optical functional device disposed at a midpoint between the two lenses in said optical coupling system.

11. An optical device according to claim 10, wherein said optical coupling system is provided as an optical coupling system array in which optical coupling systems having the same function are arranged in a row or in a plurality or rows.

12. An optical coupling system according to claim 1, wherein said first lens is physically the same as said second lens.

13. An optical coupling system comprising:
   a lens having a positive refractive power, by said lens, Gaussian beam-like luminous flux emitted from a light source being converted into approximately parallel luminous flux; and
   a reflection surface disposed at the rear of said lens so that said approximately parallel luminous flux is reflected by said reflection surface to return to said lens, said returning luminous flux being converted by said lens into converged luminous flux which is incident on a light-receiving unit disposed in said light source and its vicinity;
   wherein a distance L between said lens and said reflection surface is selected to be in a range given by an expression:

$$0.9 Lmax \leq L \leq Lmax$$

in which Lmax is a maximum distance allowing said lens to form a beam waist at the reflection surface.

14. An optical coupling system according to claim 13, wherein total coupling loss is equal to or smaller than coupling loss which occurs when the distance L between said lens and said reflection surface is in a range given by an expression $0 \leq L \leq 0.9 Lmax$.

15. An optical coupling system according to claim 13, wherein an end surface of an optical fiber serves as said light source and also as said light-receiving unit.

16. An optical device comprising an optical coupling system defined in claim 13, and an optical functional device disposed at a midpoint between the lens and the reflection surface in said optical coupling system.

17. An optical device according to claim 16, wherein said lens is provided as a lens array in which lenses having the same function are arranged in a row or in a plurality of rows.

18. An optical coupling system according to claim 13, wherein said light source and said light-receiving unit are constituted by end surfaces of optical fibers which are equal in mode field diameter to each other.

19. An optical coupling system according to claim 13, wherein said lens having a positive refractive power is a rod lens having a gradient index distribution in a direction of a radius thereof.

20. An optical coupling system according to claim 13, wherein said lens having a positive refractive power is a plano-convex lens having a gradient index distribution in a direction of an optical axis thereof.

21. An optical coupling system according to claim 13, wherein said lens having a positive refractive power is a plano-convex lens made of a homogeneous material.

22. An optical coupling system according to claim 13, wherein said lens having a positive refractive power is a sphere lens made of a homogeneous material.

23. An optical coupling system according to claim 13, wherein said lens having a positive refractive power has a grating lens surface.

* * * * *